United States Patent
Li et al.

(10) Patent No.: US 11,588,921 B2
(45) Date of Patent: Feb. 21, 2023

(54) FUNCTION INVOKING METHOD AND DEVICE, SMART HOME SYSTEM AND COMPUTER-READABLE STORAGE MEDIUM

(71) Applicant: BEIJING XIAOMI MOBILE SOFTWARE CO., LTD., Beijing (CN)

(72) Inventors: Zheng Li, Beijing (CN); Chengping Hua, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 3 days.

(21) Appl. No.: 16/876,027

(22) Filed: May 16, 2020

(65) Prior Publication Data

US 2021/0152661 A1 May 20, 2021

(30) Foreign Application Priority Data

Nov. 18, 2019 (CN) .......................... 201911130245.5

(51) Int. Cl.
H04L 67/63 (2022.01)
H04L 12/28 (2006.01)
G16Y 10/80 (2020.01)

(52) U.S. Cl.
CPC .......... H04L 67/63 (2022.05); H04L 12/2816 (2013.01); *G16Y 10/80* (2020.01)

(58) Field of Classification Search
CPC . H04L 12/2803; H04L 12/2816; H04L 67/32; H04L 67/327; G16Y 10/80
See application file for complete search history.

(56) References Cited

U.S. PATENT DOCUMENTS

| | | | |
|---|---|---|---|
| 10,181,978 B1* | 1/2019 | Argenti | H04L 67/12 |
| 2014/0324973 A1* | 10/2014 | Goel | H04W 4/70 709/204 |
| 2017/0064556 A1* | 3/2017 | Gilad | H04W 48/08 |
| 2019/0173684 A1* | 6/2019 | Ocher | H04L 67/12 |
| 2019/0208024 A1 | 7/2019 | Jablonski | |
| 2019/0289069 A1* | 9/2019 | Cano Zapata | H04L 67/51 |
| 2019/0349443 A1* | 11/2019 | Bender | H04L 67/12 |

FOREIGN PATENT DOCUMENTS

| | | |
|---|---|---|
| CN | 109407524 A | 3/2019 |
| CN | 110287036 A | 9/2019 |
| WO | 2014182692 A1 | 11/2014 |
| WO | 2019071101 A1 | 4/2019 |

OTHER PUBLICATIONS

Extended European Search Report in Application No. 20179930, dated Nov. 2, 2020.
IoT-DDL-Device Description Language for the "T" in IoT, Khaled Ahmed E et al., p. 24048-24063, IEEE Access vol. 6, 2018.
CN First Office Action in Application No. 201911130245.5, dated Sep. 28, 2020.

\* cited by examiner

*Primary Examiner* — Jeong S Park
(74) *Attorney, Agent, or Firm* — Syncoda LLC; Feng Ma

(57) ABSTRACT

A function invoking method, applied to a first device, includes: acquiring a function executing instruction; parsing device capabilities required to execute the instruction; and invoking a capability of at least one second device to execute the function executing instruction to implement a corresponding function, the second device being another device different from the first device. As such, the capabilities can be invoked between devices, such that the interconnection and intercommunication between devices can be achieved.

18 Claims, 4 Drawing Sheets

FUNCTION INVOKING METHOD AND DEVICE, SMART HOME SYSTEM AND COMPUTER-READABLE STORAGE MEDIUM

CROSS-REFERENCE TO RELATED APPLICATION

This application claims priority to Chinese Patent Application 201911130245.5 filed on Nov. 18, 2019, the disclosure of which is hereby incorporated by reference in its entirety.

BACKGROUND

With the advancement of technologies, Internet of Things (IOT) devices are more and more widely used. The IOT devices can have the capabilities of implementing multiple functions.

SUMMARY

The present disclosure generally relates to the field of terminal technologies, and more specifically, to a function invoking method, a function invoking device and a computer-readable storage medium.

According to a first aspect of embodiments of the present disclosure, there is provided a function invoking method, which is applied to a first device, the method including: acquiring a function executing instruction; parsing device capabilities required to execute the instruction; and invoking a capability of at least one second device to execute the function executing instruction to implement a corresponding function, the second device being another device different from the first device.

In some embodiments, the function invoking method according to embodiments of the present disclosure further includes:
recording in advance capabilities of one or more second devices; or discovering one or more second devices and interacting with the second device to obtain capabilities supported by the second device.

In some embodiments, for a manner of discovering one or more second devices, the discovering one or more second devices includes:
discovering one or more second devices located within the same local area network as the first device in response to the first device joining a local area network; and/or discovering a newly added second device in response to newly adding a second device to the local area network where the first device is located; and discovering a second device that communicates with the first device within a specified distance range in response to a presence of a second device within a specified distance range where the first device is located.

In some embodiments, before the invoking a capability of at least one second device to execute the function executing instruction, the method further includes:
determining that the first device does not have at least one of the parsed device capabilities;
the invoking a capability of at least one second device to execute the function executing instruction to implement a corresponding function includes:
determining at least one second device having the at least one device capability; and invoking a corresponding capability of the determined second device to execute the function executing instruction to implement a corresponding function.

In some embodiments, before the invoking a capability of at least one second device to execute the function executing instruction, the method further includes:
determining at least one second device that has the at least one device capability stronger than a corresponding capability of the first device in second devices for at least one of the parsed device capabilities.

In some embodiments, the first device determines its own capability in the following manner:
querying a recorded capability of the first device; and/or determining a capability of the first device based on a function corresponding to a hardware component of the first device itself or a function implemented by installed software.

In some embodiments, the first device determines that a capability of a second device is stronger than a corresponding capability of the first device in the following manners:
determining a capability of a second device with a higher capability level among the same capabilities of a first device and a second device based on a pre-identified capability level; and/or comparing parameters of hardware providing the device capabilities for the same device capabilities of the first device and the determined second device; and determining that the device capability of the second device is stronger than the first device in response to that hardware performance represented by hardware parameters corresponding to the corresponding device capability of the determined second device is superior to that of the first device.

In some embodiments, the parsing device capabilities required to execute the instruction includes:
determining a pre-recorded device capability required to execute the instruction; or determining a hardware component that needs to be driven to execute the instruction; determining a device capability required to execute the instruction based on a function corresponding to the hardware component; and/or executing software required to execute the instruction; and determining a device capability required to execute the instruction based on a function implemented by the software.

In some embodiments, the function invoking method according to embodiments of the present disclosure further includes:
receiving a capability invoking request of a third device; and driving corresponding hardware to implement a corresponding function based on a capability invoked by the invoking request.

In some embodiments, the function invoking method according to embodiments of the present disclosure further includes:
synchronizing change information to other devices in response to a change in any device capability of the first device.

In some embodiments, the function invoking method according to embodiments of the present disclosure further includes:
registering a capability of the first device itself with a bus; logging into the bus in response to power-on; and implementing an interaction with a login device on the bus through the bus, of which the bus is a mechanism for capability information interaction between devices.

In some embodiments, the mechanism for capability information interaction between devices includes one or more of the following: capability information definition, capability information data structure definition, and capability information transmission protocol definition;

the registering a device capability of the first device itself with a bus includes:

determining its own device capability based on its own hardware components; and obtaining data corresponding to a data structure and assigning a value to a variable in the data structure based on a capability information data structure defined for each device capability;

the logging into the bus includes:

monitoring an interface that invokes a device capability in response to completing an assignment of a variable in a data structure corresponding to a device capability; and responding to an invoking request for at least one capability in response to detecting the invoking request; and the implementing an interaction with a login device on the bus through the bus includes:

implementing an interaction with the login device on the bus through the capability information transmission protocol.

According to a second aspect of embodiments of the present disclosure, there is provided a function invoking device applied to a first device, and the function invoking device includes:

an acquisition component configured to acquire a function executing instruction; a parsing component configured to parse device capabilities required to execute the instruction; and an invoking component configured to invoke a capability of at least one second device to execute the function executing instruction to implement a corresponding function, and the second device being another device different from the first device.

In some embodiments, the function invoking device further includes:

a record component configured to record in advance capabilities of one or more second devices; and a discovery component configured to discover one or more second devices and interact with the second device to obtain capabilities supported by the second device.

In some embodiments, the discovery component discovers one or more second devices in the following manners:

discovering one or more second devices located within the same local area network as the first device in response to the first device joining a local area network; and/or discovering a newly added second device in response to newly adding a second device to the local area network where the first device is located; and discovering a second device that communicates with the first device within a specified distance range in response to a presence of a second device within a specified distance range where the first device is located.

In some embodiments, the parsing component is further configured to determine that the first device does not have at least one of the parsed device capabilities before the invoking component invokes a capability of at least one second device to execute the function executing instruction;

the invoking component invokes a capability of at least one second device to execute the function executing instruction to implement a corresponding function in the following manners:

determining at least one second device having the at least one device capability; and invoking a corresponding capability of the determined second device to execute the function executing instruction to implement a corresponding function In some embodiments, the parsing component is further configured to:

determine at least one second device that has the at least one device capability stronger than a corresponding capability of the first device in second devices for at least one of the parsed device capabilities before the invoking component invokes a capability of at least one second device to execute the function executing instruction.

In some embodiments, the first device determines its own capability in the following manners:

querying a recorded capability of the first device; and/or determining a capability of the first device based on a function corresponding to a hardware component of the first device itself or a function implemented by installed software.

In some embodiments, the first device determines that a capability of a second device is stronger than a corresponding capability of the first device in the following manners:

determining a capability of a second device with a higher capability level among the same capabilities of a first device and a second device based on a pre-identified capability level; and/or comparing parameters of hardware providing the device capabilities for the same device capabilities of the first device and the determined second device; and determining that the device capability of the second device is stronger than the first device in response to that hardware performance represented by hardware parameters corresponding to the corresponding device capability of the determined second device is superior to that of the first device.

In some embodiments, the parsing component parses a device capability required to execute the instruction in the following manner:

determining a pre-recorded device capability required to execute the instruction; or determining a hardware component that needs to be driven to execute the instruction; determining a device capability required to execute the instruction based on a function corresponding to the hardware component; and/or executing software required to execute the instruction; and determining a device capability required to execute the instruction based on a function implemented by the software.

In some embodiments, the acquisition component is further configured to receive a capability invoking request of a third device;

the invoking component is further configured to drive corresponding hardware to implement a corresponding function based on a capability invoked by the invoking request.

In some embodiments, the function invoking device according to embodiments of the present disclosure further includes:

a synchronization component configured to synchronize change information to other devices in response to a change in any device capability of the first device.

In some embodiments, the function invoking device according to embodiments of the present disclosure further includes:

a registration component configured to register a capability of the first device itself with a bus;

a login component configured to log into the bus in response to power-on; and an interaction component configured to implement an interaction with a login device on the bus through the bus, of which the bus is a mechanism for capability information interaction between devices.

In some embodiments, the mechanism for capability information interaction between devices includes one or more of the following: capability information definition, capability information data structure definition, and capability information transmission protocol definition;

the registration component registers a capability of the first device itself with a bus in the following manners:

determining its own device capability based on its own hardware components; and obtaining data corresponding to a data structure and assigning a value to a variable in the data structure based on a capability information data structure defined for each device capability;

the login component logs into the bus in the following manners:

monitoring an interface that invokes a device capability in response to completing an assignment of a variable in a data structure corresponding to a device capability; and responding to an invoking request for at least one capability in response to detecting the invoking request; and the interaction component implements an interaction with a login device on the bus in the following manner:

implementing an interaction with the login device on the bus through the capability information transmission protocol.

According to a third aspect of embodiments of the present disclosure, there is provided a function invoking device including:

a processor; and memory storing instructions executable by the processor;

wherein the processor is configured to execute the function invoking method described in the first aspect or any one of implementations in the first aspect.

According to a fourth aspect of embodiments of the present disclosure, there is provided a non-transitory computer-readable storage medium, when an instruction in the storage medium is executed by a processor of a device, the device is enabled to execute the function invoking method in the first aspect or any one of implementations in the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles various embodiments of the present disclosure.

DETAILED DESCRIPTION

Figure 1:
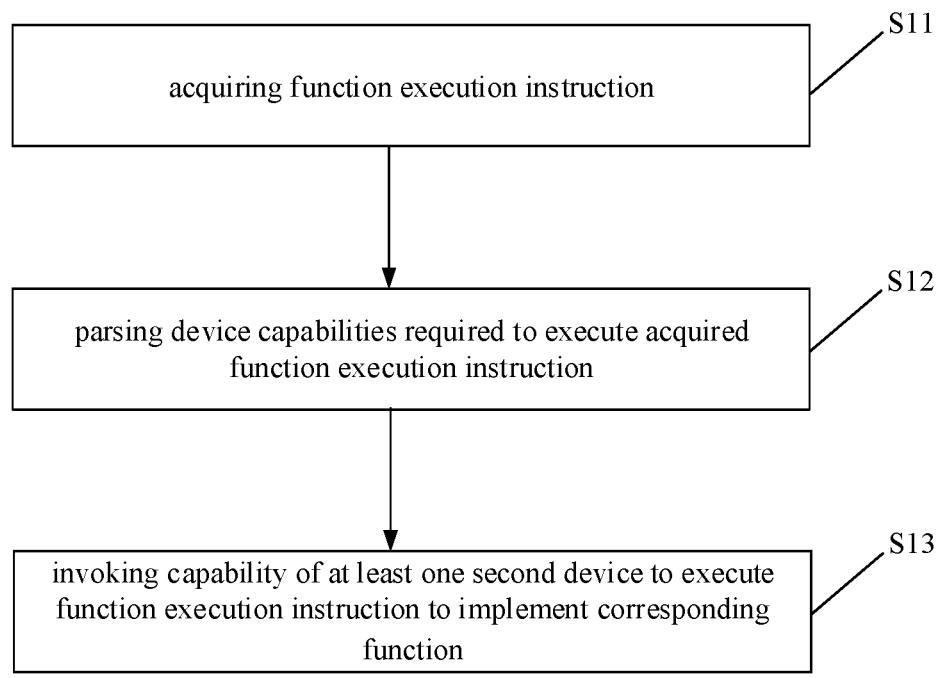
FIG. 1 is a flowchart of a function invoking method according to some exemplary embodiments.

Description will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the present disclosure. Instead, they are merely examples of apparatuses and methods consistent with aspects related to the present disclosure as recited in the appended claims.

When implementing functions, an IOT device can perform function invoking and function execution based on its own function capabilities and function executing instructions corresponding to the function capabilities. That is, typically specific functions can only be implemented on specific devices, and thus the interaction implemented by the device functions is limited.

On the other hand, the function invoking method provided by the embodiments of the present disclosure can be applied to a different function invoking scenario of an Internet of Things (IOT) device. Herein, the function invoking scenario of the IOT device may be, for example, a function realization scenario of various smart home devices in the smart home system. The IOT devices involved in the embodiments of the present disclosure may be smart home devices such as smart speakers, smart TVs, routers, and smart lights.

When the IOT device executes the specified function, usually the corresponding function can be only executed when the IOT device itself has the device capability to perform the function. Herein, the device capability of the IOT device to execute the function can be understood as a hardware support capability or a software support capability. At present, how to implement a corresponding function when the IOT device does not have a device capability to achieve the interconnection and intercommunication between the IOT devices under the Internet of Things is a hot research topic.

In view of this, the embodiments of the present disclosure provide a function invoking method, and in the function invoking method, when a device receives a function executing instruction to execute a specified function, a capability for executing the specified function is invoked from another device other than itself to implement the execution of the corresponding specified function and the invoking of the functional capabilities between the devices, so as to achieve the interconnection and intercommunication between the devices.

In the embodiments of the present disclosure, for convenience of description, a device that receives a function executing instruction is referred to as a first device, and a device whose functional capability is invoked is referred to as a second device. It can be understood that the first device can also serve as the second device, and its functional capability can also be invoked by other devices, and the second device can also serve as the first device to invoke the functional capabilities of other devices.

FIG. 1 is flowchart of a function invoking method according to some exemplary embodiments, and as shown in FIG. 1, the function invoking method applied to the first device includes the following steps.

In step S11, a function executing instruction is acquired.

In the embodiments of the present disclosure, the function executing instruction can be input by a user, or can be sent from other devices, and of course, can be triggered by the first device itself based on a predetermined condition. For example, the first device is a speaker, and the function executing instruction is a "turn on the TV" instruction. The "turn on the TV" instruction can be a voice instruction input by the user, for example, "Xiao Ai, please help me turn on the TV". Alternatively, it can also be a function control instruction input to the speaker from other devices such as a cloud server, etc. to perform a control to turn on the TV. Alternatively, it can be an instruction to trigger the speaker to automatically turn on the TV based on a predetermined trigger condition for the speaker to turn on the TV.

In step S12, device capabilities required to execute the acquired function executing instruction is parsed.

In some examples, when the function executing instruction is executed to implement the function corresponding to the function executing instruction, it is necessary for the device to support the hardware capability or software capability to execute the function. For example, the function executing instruction of "turn on the TV" is executed, it is necessary to support a capability to perform a control to turn on or turn off the TV. For example, a remote controller has a device capability to turn on the TV, but the mobile phone on which a remote controller application is not installed does not have the device capability to turn on the TV; and for another example, the function executing instruction of "play video" is executed, it is necessary for the playback device to have at least the display capability and the sound playback capability, the device without a display screen does not have the display capability, and the device without speakers or headphones playback channels does not have the sound playback capability.

In step S13, a capability of at least one second device is invoked to execute the function executing instruction to implement a corresponding function.

In the embodiments of the present disclosure, the invoked second device is one or more other devices different from the first device. For example, in the above example, it is assumed that the function executing instruction of "turn on the TV" is executed and is received by the mobile phone on which the remote controller application is not installed, the mobile phone needs to invoke a capability of turning on the TV of the remote controller to execute the function executing instruction of "turn on the TV" so as to turn on the TV. The first device can invoke a plurality of second devices, and one capability or a plurality of capabilities of each second device can be invoked.

In the embodiments of the present disclosure, when the first device acquires the function executing instruction, it invokes the capability of the second device to execute the function executing instruction to implement the corresponding function, and thus the capabilities can be invoked between the devices, thereby achieving the interconnection and intercommunication between the devices.

In the embodiments of the present disclosure, in order to implement the capability of the first device to invoke the second device, on the one hand, the first device can record in advance capabilities of one or more second devices, on the other hand, the first device can discover one or more second devices in real time and interact with the second device to obtain capabilities supported by the second device when performing the capability invoking.

In some embodiments of the present disclosure, the first device can use a "bus" function to record and store the capabilities of the first device and the second device, and maintain the interaction of capability information between devices. Herein, the bus can be understood as a mechanism for capability information interaction between devices, and can also be understood as a service. For example, the mechanism for capability information interaction between devices can include one or more of the following: capability information definition, capability information data structure definition, and capability information transmission protocol definition.

That is, the capability information can be defined in advance, for example: a device equipped with a display screen has a display capability, a device equipped with speakers has a sound playback capability, a device equipped with communication modules has a communication capability, a device equipped with processors has a computing capability, and it can also be determined that the device has the corresponding capability through the function implemented by installing the software, for example, the device on which the navigation software is installed has a navigation capability, which are too numerous to list here. The data structure can be defined for each capability, which includes setting the capability identifier, hardware parameters and software parameters, etc. corresponding to the capability, for the capability, and defining the transmission protocol and the transmission interface when the capability information interaction is performed between the devices, so that the capability information can be discovered and synchronized between the devices, to realize mutual invoking of the capabilities and expand their own functions.

When the capability is invoked, the invoked capability of the corresponding device can only be invoked, for example, when the TV invokes the audio capturing capability of the speaker, the sound pickup device of the speaker (such as a microphone) can only be used instead of other components of the speaker, and accordingly, in addition to providing the relevant definition of the capability information transmission, the device should also provide the corresponding capability invoking interface, i.e., provide the invoking interface of the hardware component or the software corresponding to the capability, so as to provide the capability to the invoking device. Following the above example, a corresponding pickup device invoking interface should be provided for the audio capturing capability of the speaker, and when the TV needs to invoke the audio capturing capability of the speaker, the invoking interface of the microphone component of the speaker can be invoked to control the microphone of the speaker to perform the audio capturing, and transmit the captured audio data to the TV.

Further, in the embodiments of the present disclosure, the "bus" function can be executed by respective devices independently, that is, the bus can also be understood as an application installed on the device. The bus installed on the device can record and store the capability registered by respective devices. For example, the first device can register the capability of the first device itself with the bus, and other devices can also register the capability with the bus in the first device.

Further, when the first device invokes the capability of the second device, it is possible to control the second device to use the corresponding capability to complete the target function, which is equivalent to expanding the capability of the first device, and when first device is expanding its own capability, it can perform the data transmission with the second device to enable the second device to complete the corresponding function, and the control right is still on the first device side. For example, it is assumed that the first device is the TV, if the TV does not have a camera function when making a video call, the TV can find a camera device with a camera function and control the camera device to capture data, the TV obtains the data captured by the camera device and transmits it to the communication peer. In this way, the TV and the camera device complete the control of the TV on the camera device through the data transmission, the control right is still on the TV, and the camera device expands the function of the TV under the control of the TV.

Figure 2:
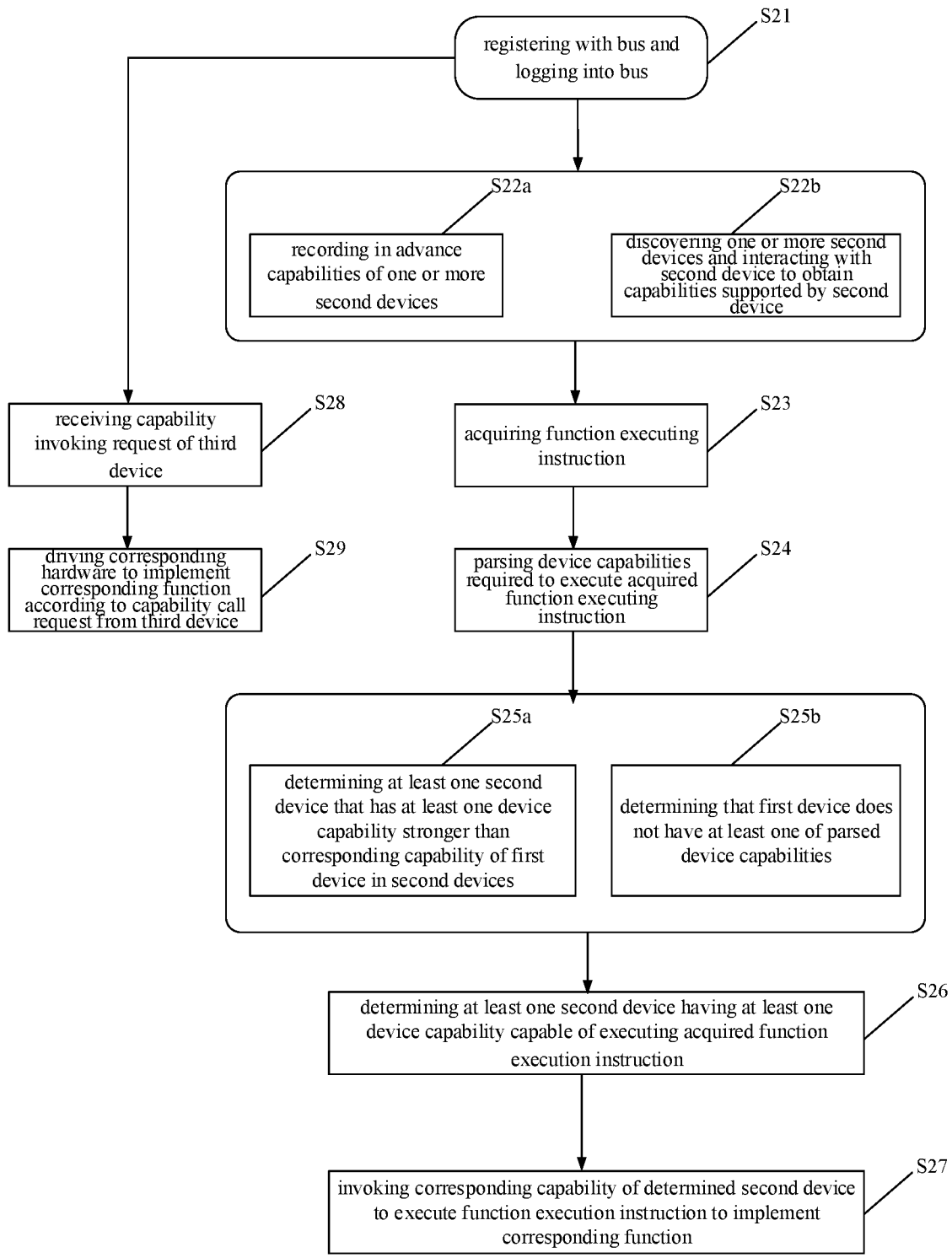
FIG. 2 is a flowchart of a function invoking method according to some exemplary embodiments.

FIG. 2 is a flowchart of a function invoking method according to some exemplary embodiments, and as shown in FIG. 2, the function invoking method applied to the first device includes the following steps.

In step S21, registering with the bus and logging into the bus are performed.

In some examples of the present disclosure, the first device determines its own device capability based on its own hardware components, obtains data corresponding to a data structure and assigns a value to a variable in the data structure abased on a capability information data structure defined for each device capability, and registers its own capability with the bus.

Herein, in the embodiments of the present disclosure, when logging into the bus, the first device can monitor an interface that invokes a device capability in response to completing an assignment of a variable in a data structure corresponding to a device capability. An invoking request for at least one capability is responded in response to detecting the invoking request.

In the embodiments of the present disclosure, the first device can implement the interaction with the login device on the bus through the bus. For example, the interaction with the login device on the bus is implemented through the capability information transmission protocol of the bus.

In some examples, the second device can perform the registration on the bus of the first device, so that the first device stores the capabilities of one or more second devices, and then invokes the capabilities of the second device when the capability invoking is required subsequently.

In step S22a, capabilities of one or more second devices are recorded in advance.

In the embodiments of the present disclosure, the first device can adopt a pre-configuration mode to record in advance the capabilities of one or more second devices. For example, the capabilities of one or more second devices are recorded on the bus of the first device in advance.

In step S22b, one or more second devices are discovered and interacted with the second device to obtain capabilities supported by the second device.

In the embodiments of the present disclosure, the first device can discover one or more second devices in one or a combination of the following manners: discovering one or more second devices located within the same local area network as the first device in response to the first device joining a local area network; discovering a newly added second device in response to newly adding a second device to the local area network where the first device is located; and discovering a second device that communicates with the first device within a specified distance range in response to a presence of a second device within a specified distance range where the first device is located.

In the embodiments of the present disclosure, the first device can record the discovered capabilities of one or more second devices on the bus of the first device.

It can be understood that the executing sequence of step S22, step S21a, and step S21b is not limited, it can be that after the capabilities of respective devices are discovered, a registration is performed and the bus is logged on to record the capabilities of respective devices on the bus.

In the embodiments of the present disclosure, in response to a change in any device capability of the first device, the change information is synchronized to other devices to implement the real-time update of the device capability.

In step S23, the function executing instruction is acquired.

In step S24, the device capability required to execute the acquired function executing instruction is parsed.

In some examples of the present disclosure, when parsing the device capabilities required for executing the acquired function executing instruction, on the one hand, the first device can determine the device capability required to execute the acquired function executing instruction based on the pre-recorded capability. On the other hand, in the embodiments of the present disclosure, the first device can determine the hardware component that needs to be driven to execute the acquired function executing instruction, and determine the device capability required to execute the acquired function executing instruction based on the function corresponding to the hardware component that needs to be driven. In yet another aspect, the mobile device in the embodiments of the present disclosure can also determine the software that needs to be installed to execute the acquired function executing instruction, and determine the corresponding device capability based on the function implemented by the software.

In the embodiments of the present disclosure, the device capability required to execute the acquired function executing instruction can be one type or multiple types. For example, the function executing instruction is "turn on the light", and at this time, the device capability required to execute the function executing instruction of "turn on the light" is a switch for turning on or off the light. For another example, the function executing instruction is "video call", and it is determined that the hardware components that need to be driven to execute the function executing instruction of "video call" should include at least an image capturing device such as a camera and a sound pickup device such as a microphone, etc., that is, the device capabilities required to execute the function executing instruction of "video call" are the image capturing device such as the camera and the sound pickup device such as the microphone, etc.

In the embodiments of the present disclosure, after the device capabilities required to execute the acquired function executing instruction are parsed, on the one hand, a second device with corresponding device capability can be directly invoked to execute the corresponding function executing instruction. On the other hand, the device capability of the first device can be determined firstly, and when the first device has the device capability required to execute the acquired function executing instruction, it is determined to invoke the device capability of the first device itself to execute the corresponding function executing instruction, or invoking the device capability of the second device to execute the corresponding function executing instruction, based on the device capability of the first device.

In some examples of the present disclosure, the first device can determine its own capability by querying the recorded capability to determine the capability of the first device. The first device can also determine its own capability based on a function corresponding to a hardware component of the first device itself or a function implemented by the installed software.

In the embodiments of the present disclosure, it can be first determined whether the first device has the device capability required to execute the acquired function executing instruction, and if the first device has the device capability required to execute the acquired function executing instruction, it is determined to invoke the device capability of the first device to execute the corresponding function executing instruction.

Further, in the embodiments of the present disclosure, when the first device has the device capability required to execute the acquired function executing instruction, i.e., the first device and the second device have the same at least one device capability, if the device capability of the first device is lower than the corresponding device capability of the second device, it can also be determined to invoke the device capability of the second device to execute the corresponding function executing instruction. In other words, in the embodiments of the present disclosure, among the parsed device capabilities for executing the acquired function executing instruction, if there exists, in second devices, a second device that has the at least one device capability to be able to execute the acquired function executing instruction and stronger than a corresponding capability of the first device, the capability of the second device can be determined and invoked to execute the corresponding function executing instruction.

In step S25a, the first device and the second device have the same at least one device capability, and at least one second device that has the at least one device capability stronger than a corresponding capability of the first device in the second devices is determined.

In some exemplary embodiments of the present disclosure, for a case in which the first device and the second device have the same device capabilities, one or a combination of the following manners can be used to determine that the capability of the second device is stronger than the corresponding capability of the first device.

In one manner, in the embodiments of the present disclosure, a capability level identifier is predetermined, and when judging the capability, the capability of the second device having a higher level device capability among the same capabilities of the first device and the second device is determined based on the pre-identified capability level.

In another manner, for the case in which the first device and the determined second device have the same device capabilities, the parameters of the hardware providing the device capabilities are compared; it is determined that the device capability of the second device is stronger than the first device in response to that hardware performance represented by the hardware parameters corresponding to the corresponding device capability of the determined second device is superior to that of the first device. For example, the display capability of the mobile phone is lower than the display capability of the TV, it is assumed that the first device is the mobile phone and the mobile phone receives a video playback instruction, the mobile phone determines that it has the display capability, but the TV also has the display capability by querying through the bus, and the hardware component which enables the TV to have a display capability is the display screen, the hardware parameters of the display screen can include at least size, resolution, etc., comparing with the hardware parameters of the display screen of the TV, the display screen of the mobile phone has a smaller size, and a lower resolution, such that the hardware parameters of the display screen of the TV is superior to that of the mobile phone, and it can be determined that the display capability of the TV is stronger than the mobile phone.

In some embodiments of the present disclosure, when the first device does not have the device capability required to execute the acquired function executing instruction, it is determined to invoke the device capability of the second device to execute the corresponding function executing instruction.

For example, in the embodiments of the present disclosure, on the one hand, the first device does not have the device capability required to execute the acquired function executing instruction at all. Or on the other hand, when the first device does not have one or more device capabilities required to execute the acquired function executing instruction, the first device can determine to invoke the device capability of the second device to execute the corresponding function executing instruction.

In step S25b, it is determined that the first device does not have at least one of the parsed device capabilities.

In step S26, at least one second device having at least one device capability executing the acquired function executing instruction.

In step S27, a corresponding capability of the determined second device is invoked to execute the function executing instruction to implement a corresponding function.

In some examples of the present disclosure, it is assumed that the function executing instruction is "video call", and the device capabilities required for the "video call" are the image capturing device capability and the sound pickup device capability. The first device is the TV. In some examples, the TV does not have the image capturing device capability required to execute the "video call" bus has the microphone with the sound pickup device capability, and then the TV as the first device can invoke the camera with the image capturing device capability as the second device to execute the device capability of image capturing. Alternatively, the TV does not have the image capturing device capability and the sound pickup device capability required for "video call", and then the TV as the first device can invoke the camera with the image capturing device capability and the microphone with the sound pickup device capability as the second device to execute the capabilities of image capturing and sound pickup, and execute the function of video call. Alternatively, the TV has the microphone with the sound pickup device capability, but the sound pickup capability of the microphone of the TV is lower than that of other microphones, and then the TV can still invoke the other microphones with the sound pickup device capability to execute the sound pickup function of the video call.

In the above embodiments of the present disclosure, the first device can implement the mutual invoking of the capabilities between the devices to achieve the interconnection and intercommunication between the devices by invoking the device capability of the second device to execute the function corresponding to the acquired function executing instruction.

In some embodiments of the present disclosure, the first device records the device capability of the first device itself, so that the first device can also receive capability invoking requests from other devices, and drive corresponding hardware to implement corresponding functions based on the capability invoking requests from other devices. Therefore, the function invoking method provided by the embodiments of the present disclosure can further include the following steps.

In step S28, a capability invoking request of the third device is received.

In the embodiments of the present disclosure, the third device is a device that invokes the capability of the first device.

For example, in the embodiments of the present disclosure, the first device is a TV and has the display screen device capability. The third device is a camera. The camera does not have the display screen device capability, and then the camera can invoke the display screen device capability of the TV to display the captured images.

In step S29, corresponding hardware is driven to implement corresponding function based on the capability invoking request of the third device.

For example, in the above examples, when the TV with a display screen device capability receives a capability invoking request to display an image from the camera, it can drive the display screen to implement the image display function.

The above embodiments of the present disclosure relate to the function invoking method, which invokes the device capabilities between devices, implements the mutual invoking of capabilities of the respective devices, and achieves the interconnection and intercommunication between the devices Based on the same concept, the embodiments of the present disclosure also provide a function invoking device.

It can be understood that, in order to implement the above functions, the function invoking device provided by the embodiments of the present disclosure includes a corresponding hardware structure and/or software module for executing respective functions. With reference to the components and algorithm steps of the examples disclosed in the embodiments of the present disclosure, the embodiments of the present disclosure can be implemented in the form of hardware or a combination of hardware and computer software. Whether a function is executed through the hardware or a manner that the computer software drives the hardware depends on the specific application and design constraints of the technical solution. A person skilled in the art can use different methods to implement the described functions for each specific application, but such implementation should not be considered to go beyond the scope of the technical solutions of the embodiments of the present disclosure.

Figure 3:
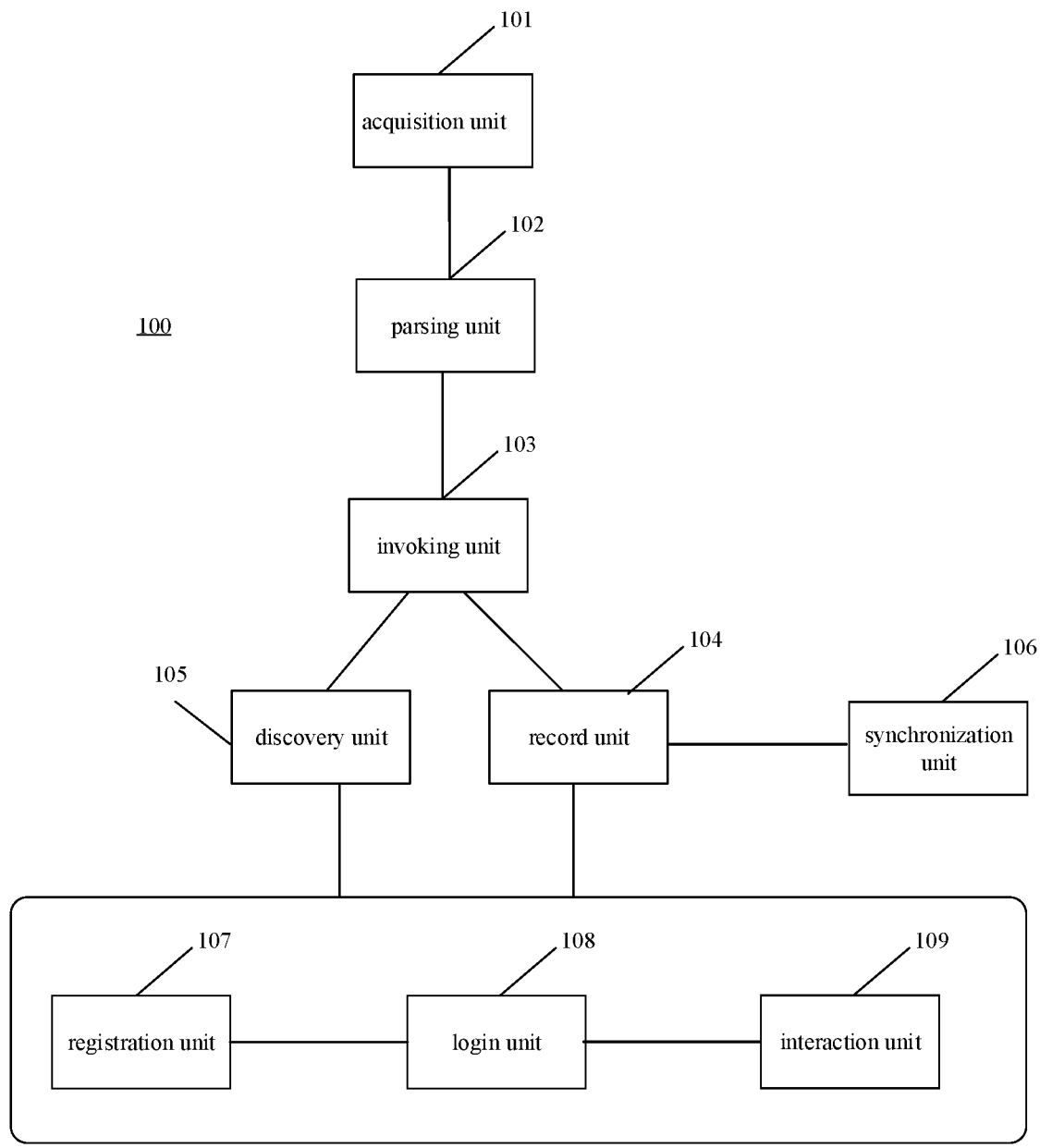
FIG. 3 is a block diagram of a function invoking device according to some exemplary embodiments.

FIG. 3 is a block diagram of a function invoking device according to some exemplary embodiments. As shown in FIG. 3, a function invoking device 100 includes an acquisition component 101, a parsing component 102 and an invoking component 103.

The acquisition component 101 is configured to acquire a function executing instruction. The parsing component 102 is configured to parse device capabilities required to execute the instruction. The invoking component 103 is configured to invoke a capability of at least one second device to execute the function executing instruction to implement a corresponding function, and the second device is another device different from the first device.

In some embodiments, the function invoking device 100 further includes a record component 104 configured to record in advance capabilities of one or more second devices. A discovery component 105 is configured to discover one or more second devices and interact with the second device to obtain capabilities supported by the second device.

In some embodiments, the discovery component 105 discovers one or more second devices in the following manners:

discovering one or more second devices located within the same local area network as the first device in response to the first device joining a local area network; and/or discovering a newly added second device in response to newly adding a second device to the local area network where the first device is located; and discovering a second device that communicates with the first device within a specified distance range in response to a presence of a second device within a specified distance range where the first device is located.

In some embodiments, the parsing component 102 is further configured to determine that the first device does not have at least one of the parsed device capabilities before the invoking component 103 invokes a capability of at least one second device to execute the function executing instruction.

The invoking component 103 is configured to invoke a capability of at least one second device to execute the function executing instruction to implement a corresponding function in the following manners:

determining at least one second device having the at least one device capability, and invoking a corresponding capability of the determined second device to execute the function executing instruction to implement a corresponding function.

In some embodiments, the parsing component 102 is further configured to determine at least one second device that has the at least one device capability stronger than a corresponding capability of the first device in the second devices, for at least one of the parsed device capabilities, before the invoking component 103 invokes a capability of at least one second device to execute the function executing instruction.

In some embodiments, the parsing component 102 determines its own capability in the following manners: querying a recorded capability of the first device; and/or determining a capability of the first device based on a function corresponding to a hardware component of the first device itself or a function implemented by installed software.

In some embodiments, the parsing component 102 determines that a capability of a second device is stronger than a corresponding capability of the first device in the following manners:

determining a capability of a second device with a higher capability level among the same capabilities of a first device and a second device based on a pre-identified capability level; and/or comparing parameters of hardware providing the device capabilities for the same device capabilities of the first device and the determined second device; and determining that the device capability of the second device is stronger than the first device in response to that hardware performance represented by hardware parameters corresponding to the corresponding device capability of the determined second device is superior to that of the first device.

In some embodiments, the parsing component 102 parses a device capability required to execute the instruction in the following manners:

determining a pre-recorded device capability required to execute the instruction; or determining a hardware component that needs to be driven to execute the instruction; determining a device capability required to execute the instruction based on a function corresponding to the hardware component; and/or executing software required to execute the instruction; and determining a device capability required to execute the instruction based on a function implemented by the software.

In some embodiments, the acquisition component 101 is further configured to receive a capability invoking request of a third device.

The invoking component 103 is further configured to drive corresponding hardware to implement a corresponding function based on a capability invoked by the invoking request.

In some embodiments, the function invoking device 100 according to embodiments of the present disclosure further includes:

a synchronization component 106 configured to synchronize change information to other devices in response to a change in any device capability of the first device.

In some embodiments, the function invoking device 100 according to embodiments of the present disclosure further includes a registration component 107, a login component 108 and an interaction component 109.

The registration component 107 is configured to register a capability of the first device itself with a bus. The login component 108 is configured to log into the bus in response to power-on. The interaction component 109 is configured to implement an interaction with a login device on the bus through the bus. Herein, the bus is a mechanism for capability information interaction between devices.

In some embodiments, the mechanism for capability information interaction between devices includes one or more of the following: capability information definition, capability information data structure definition, and capability information transmission protocol definition.

The registration component 107 determines its own device capability based on its own hardware components, obtains data corresponding to a data structure, and assigns a value to a variable in the data structure based on a capability information data structure defined for each device capability, so that the capability to register the first device with the bus is implemented.

The login component 108 logs into the bus in the following manners: monitoring an interface that invokes a device capability in response to completing an assignment of a variable in a data structure corresponding to a device capability; and responding to an invoking request in response to detecting the invoking request for at least one capability.

The interaction component 109 implements an interaction with a login device on the bus through the bus in the following manner: implementing an interaction with the login device on the bus through the capability information transmission protocol.

With respect to the devices in the above embodiments, the implementations for performing operations by individual modules therein have been described in detail in the embodiments regarding the methods, which will not be elaborated herein.

Figure 4:
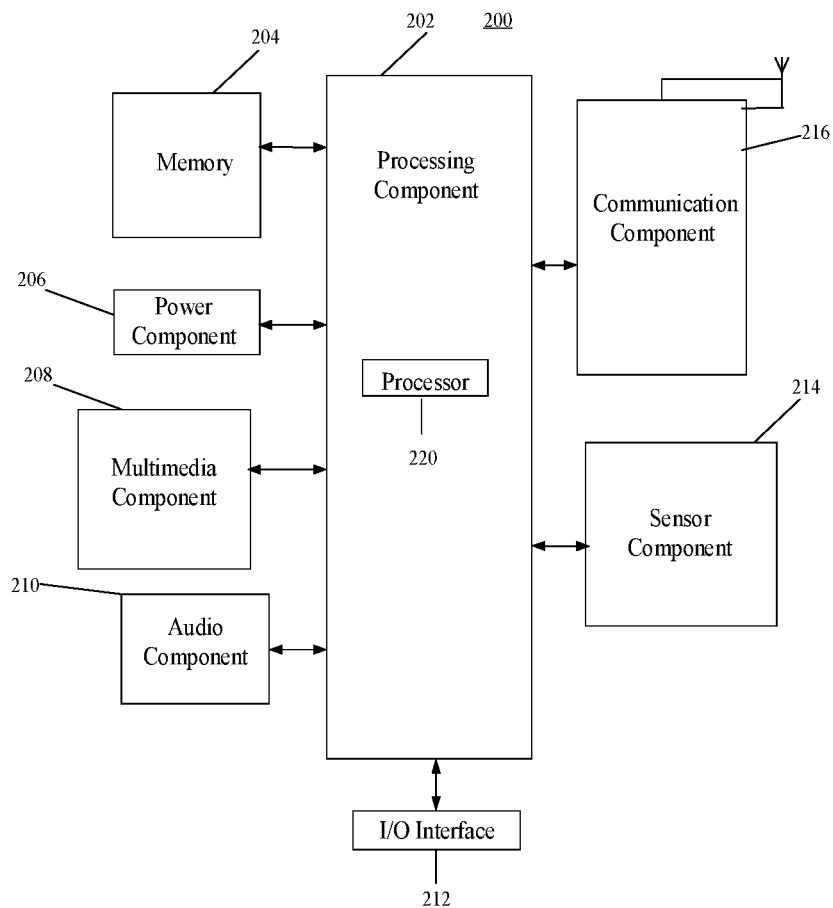
FIG. 4 is a block diagram of a function invoking device according to some exemplary embodiments.

FIG. 4 is a block diagram of a remote control apparatus 200 according to some exemplary embodiments. For example, the remote control apparatus 200 can be a mobile phone, a computer, a digital broadcast terminal, a messaging device, a gaming console, a tablet, a medical device, fitness equipment, a personal digital assistant, and the like.

Referring to FIG. 4, the remote control apparatus 200 can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the remote control apparatus 200, such as the operations associated with display, telephone calls, data communications, camera operations, and recording operations. The processing component 202 can include one or more processors 220 to execute instructions to implement all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the remote control apparatus 200. Examples of such data include instructions for any applications or methods operated on the remote control apparatus 200, contact data, phonebook data, messages, pictures, videos, etc. The memory 204 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 supplies power to various components of the remote control apparatus 200. The power component 206 can include a power management system, one or more power sources, and any other components associated with the generation, management, and distribution of power in the remote control apparatus 200.

The multimedia component 208 includes a screen providing an output interface between the remote control apparatus 200 and a user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive external multimedia data while the remote control apparatus 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone ("MIC") configured to receive an external audio signal when the remote control apparatus 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the remote control apparatus 200. For instance, the sensor component 214 can detect an on/off status of the remote control apparatus 200, relative positioning of components, e.g., the display and a keypad, of the remote control apparatus 200, the sensor component 214 can also detect a change in position of the remote control apparatus 200 or one component of the remote control apparatus 200, a presence or absence of user contact with the remote control apparatus 200, an orientation or an acceleration/deceleration of the remote control apparatus 200, and a change in temperature of the remote control apparatus 200. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate wired or wireless communication between the remote control apparatus 200 and other devices. The remote control apparatus 200 can access a wireless network based on a communication standard, such as Wi-Fi, 2G, 3G, 4G, 5G, or a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In exemplary embodiments, the remote control apparatus 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 204 including the instructions executable by the processor 220 in the remote control apparatus 200, for performing the above-described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have one or more of the following advantages. The device can invoke capabilities of other devices to execute the function executing instruction to implement a corresponding function when acquiring the function executing instruction, and thus the capabilities can be invoked between devices, thereby achieving the interconnection and intercommunication between devices.

It will be understood that the singular forms "a/an," "said," and "the" in the disclosure are intended to include the plural forms unless the context clearly indicates otherwise.

It will be further understood that the "plurality" in the disclosure means two or more, and other quantifiers are similar. "And/or" describes the relationship of the related objects, indicating that there can be three relationships, for example, A and/or B can indicate three cases: A exists alone, A and B exist simultaneously, and B exists alone. The character "/" generally indicates that the relationship between the contextually relevant objects is a "or" relationship. The singular forms "a/an," "said," and "the" are also intended to include the plural forms unless the context clearly indicates otherwise.

It will be further understood that although the terms such as "first" and "second" are used to describe various information, this information should not be limited by these terms. The terms are only used to distinguish the same type of information from each other, and do not indicate a specific order or importance. In fact, the expressions such as "first" and "second" can be used interchangeably. For instance, first information can be referred to as second information without departing from the scope of the disclosure, and similarly, the second information can also be referred to as the first information.

It will be further understood that although the operations in the embodiments of the present disclosure are described in a specific order in the drawings, it will not be understood as requiring that the operations are performed in the specific order shown or in a serial order, or that perform all the operations shown to acquire the desired result. In certain environments, multitasking and parallel processing may be advantageous.

Some other embodiments of the disclosure will be apparent to those skilled in the art from consideration of the description and practice of the disclosure disclosed here. This application is intended to cover any variations, uses, or adaptations of the disclosure following the general principles thereof and including such departures from the present disclosure as come within known or customary practice in the art. It is intended that the description and examples be considered as exemplary only, with a true scope and spirit of the disclosure being indicated by the appended claims.

The invention claimed is:

1. A function invoking method, applied to a first device, comprising:
    acquiring a function executing instruction;
    parsing device capabilities required to execute the function executing instruction;
    determining at least one second device having at least one of the device capabilities; and
    invoking a corresponding capability of the determined at least one second device, and controlling the second device to use the capability to execute the function executing instruction to implement a corresponding function, and the second device being another device different from the first device,
    wherein a bus function is used to record and store the capabilities of the first device and the second device, and an interaction of capability information between devices is maintained;
    wherein the method further comprises:
    registering a capability of the first device itself with a bus;
    logging into the bus in response to power-on; and
    implementing an interaction with a login device on the bus through the bus, of which the bus is a mechanism for capability information interaction between devices;
    wherein mechanism for capability information interaction between devices includes one or more of: capability information definition, capability information data structure definition, and capability information transmission protocol definition; and
    wherein the method further comprises:
    determining device capability of the first device based on hardware components of the first device;
    obtaining data corresponding to a data structure and assigning a value to a variable in the data structure based on a capability information data structure defined for each device capability;
    monitoring an interface that invokes a device capability in response to completing an assignment of a variable in a data structure corresponding to a device capability;
    responding to an invoking request for at least one capability in response to detecting the invoking request; and implementing an interaction with the login device on the bus through the capability information transmission protocol.

2. The function invoking method according to claim 1, further comprising at least one of:
recording in advance capabilities of one or more second devices; and
discovering one or more second devices and interacting with the second device to obtain capabilities supported by the second device.

3. The function invoking method according to claim 2, the discovering one or more second devices comprises at least one of:
discovering one or more second devices located within the same local area network as the first device in response to the first device joining a local area network; and
discovering a newly added second device in response to newly adding a second device to the local area network where the first device is located;
and further comprises:
discovering a second device that communicates with the first device within a specified distance range in response to a presence of a second device within a specified distance range where the first device is located.

4. The function invoking method according to claim 1, wherein prior to the invoking a capability of at least one second device to execute the function executing instruction, the method further comprises:
determining that the first device does not have at least one of the parsed device capabilities.

5. The function invoking method according to claim 4, wherein the first device determines its own capability in at least one of the following manners:
querying a recorded capability of the first device; and
determining a capability of the first device based on one of a function corresponding to a hardware component of the first device itself and a function implemented by installed software.

6. A non-transitory computer-readable storage medium having stored therein instructions that, when executed by a processor of a computer, cause the computer to perform the function invoking method of claim 1.

7. The function invoking method according to claim 1, wherein prior to the invoking a capability of at least one second device to execute the function executing instruction, the method further comprises:
determining at least one second device that has the at least one device capability stronger than a corresponding capability of the first device, in second devices, for at least one of the parsed device capabilities.

8. A function invoking device, applied to a first device, comprising:
memory storing processor-executable instructions; and
a processor configured to:
acquire a function executing instruction;
parse device capabilities required to execute the instruction;
determine at least one second device having at least one of the device capabilities; and
invoke a corresponding capability of the determined at least one second device, and control the second device to use the capability to execute the function executing instruction to implement a corresponding function, and the second device being another device different from the first device,
wherein a bus function is used to record and store the capabilities of the first device and the second device, and an interaction of capability information between devices is maintained;
wherein the processor is further configured to perform:
registering a capability of the first device itself with a bus;
logging into the bus in response to power-on; and
implementing an interaction with a login device on the bus through the bus, of which the bus is a mechanism for capability information interaction between devices;
wherein mechanism for capability information interaction between devices includes one or more of: capability information definition, capability information data structure definition, and capability information transmission protocol definition; and
wherein the processor is further configured to perform:
determining device capability of the first device based on hardware components of the first device;
obtaining data corresponding to a data structure and assigning a value to a variable in the data structure based on a capability information data structure defined for each device capability;
monitoring an interface that invokes a device capability in response to completing an assignment of a variable in a data structure corresponding to a device capability;
responding to an invoking request for at least one capability in response to detecting the invoking request; and
implementing an interaction with the login device on the bus through the capability information transmission protocol.

9. The function invoking device according to claim 8, wherein the processor is further configured to:
record in advance capabilities of one or more second devices; and
discover one or more second devices and interact with the second device to obtain capabilities supported by the second device.

10. The function invoking device according to claim 9, wherein the processor is further configured to discover one or more second devices by at least one of:
discovering one or more second devices located within the same local area network as the first device in response to the first device joining a local area network; and
discovering a newly added second device in response to newly adding a second device to the local area network where the first device is located;
and by:
discovering a second device that communicates with the first device within a specified distance range in response to a presence of a second device within a specified distance range where the first device is located.

11. The function invoking device according to claim 8, wherein the processor is further configured to:
determine that the first device does not have at least one of the parsed device capabilities before invoking a capability of at least one second device to execute the function executing instruction; and
invoke a capability of at least one second device to execute the function executing instruction to implement a corresponding function by:
determining at least one second device having the at least one device capability; and
invoking a corresponding capability of the determined second device to execute the function executing instruction to implement a corresponding function.

12. The function invoking device according to claim 11, wherein the first device determines its own capability by at least one of:
  querying a recorded capability of the first device; and
  determining a capability of the first device based on one of a function corresponding to a hardware component of the first device itself and a function implemented by installed software.

13. The function invoking device according to claim 8, wherein the first device determines that a capability of a second device is stronger than a corresponding capability of the first device by at least one of:
  determining a capability of a second device with a higher capability level among the same capabilities of a first device and a second device based on a pre-identified capability level; and
  comparing parameters of hardware providing the device capabilities for the same device capabilities of the first device and the determined second device; and determining that the device capability of the second device is stronger than the first device in response to that hardware performance represented by hardware parameters corresponding to the corresponding device capability of the determined second device is superior to that of the first device.

14. The function invoking device according to claim 8, wherein the processor is configured to parse a device capability required to execute the instruction by at least one of:
  determining a pre-recorded device capability required to execute the instruction; and
  determining a hardware component that needs to be driven to execute the instruction; determining a device capability required to execute the instruction based on a function corresponding to the hardware component; and/or executing software required to execute the instruction; and determining a device capability required to execute the instruction based on a function implemented by the software.

15. The function invoking device according to claim 8, wherein the processor is further configured to:
  receive a capability invoking request of a third device; and
  drive corresponding hardware to implement a corresponding function based on a capability invoked by the invoking request.

16. The function invoking device according to claim 8, wherein the processor is further configured to:
  synchronize change information to other devices in response to a change in any device capability of the first device.

17. A smart home system comprising the function invoking device according to claim 8, further comprising a plurality of Internet of Things (IoT) devices including a first device and at least one second device, wherein at least some of the plurality of the IoT devices are configured to invoke capabilities of other of the plurality of IoT devices to execute a plurality of function executing instructions to implement corresponding functions when acquiring the plurality of function executing instructions, to thereby realize invoking capabilities, and interconnection and intercommunication among the plurality of IoT devices.

18. The function invoking device according to claim 8, wherein the processor is further configured to:
  determine at least one second device that has the at least one device capability stronger than a corresponding capability of the first device in second devices for at least one of the parsed device capabilities before invoking a capability of at least one second device to execute the function executing instruction.

* * * * *